(12) United States Patent
Velten et al.

(10) Patent No.: US 10,941,041 B2
(45) Date of Patent: Mar. 9, 2021

(54) METHOD OF MANUFACTURING GRAPHENE USING PHOTOREDUCTION

(71) Applicant: Savannah River Nuclear Solutions, LLC, Aiken, SC (US)

(72) Inventors: Josef A. Velten, Augusta, GA (US); Brent Peters, Aiken, SC (US); Steven M. Serkiz, Aiken, SC (US); Jay B. Gaillard, Aiken, SC (US); Deepika Saini, Morrisville, NC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 40 days.

(21) Appl. No.: 16/029,017

(22) Filed: Jul. 6, 2018

(65) Prior Publication Data
US 2020/0010324 A1 Jan. 9, 2020

(51) Int. Cl.
*C01B 32/184* (2017.01)
*B01J 19/12* (2006.01)

(52) U.S. Cl.
CPC .......... *C01B 32/184* (2017.08); *B01J 19/123* (2013.01); *B01J 19/127* (2013.01); *B01J 2219/0879* (2013.01); *B01J 2219/1203* (2013.01)

(58) Field of Classification Search
CPC ..... C01B 32/184; B01J 19/123; B01J 19/127; B01J 2219/0879; B01J 2219/1203
USPC ............................ 204/157.4, 157.44, 157.47
See application file for complete search history.

(56) References Cited

U.S. PATENT DOCUMENTS

| 8,828,193 | B2* | 9/2014 | Sundara | B01J 19/12 |
| | | | | 204/157.47 |
| 2010/0221508 | A1* | 9/2010 | Huang | B82Y 30/00 |
| | | | | 204/157.47 |
| 2010/0255984 | A1 | 10/2010 | Sutter et al. | |
| 2010/0266964 | A1* | 10/2010 | Gilje | B82Y 30/00 |
| | | | | 204/157.47 |
| 2010/0301279 | A1 | 12/2010 | Nesper et al. | |
| 2011/0227000 | A1 | 9/2011 | Ruoff et al. | |
| 2012/0265122 | A1* | 10/2012 | El-Shall | B82Y 30/00 |
| | | | | 204/157.47 |
| 2012/0308884 | A1 | 12/2012 | Oguni et al. | |
| 2012/0328906 | A1 | 12/2012 | Kwon et al. | |

(Continued)

FOREIGN PATENT DOCUMENTS

| CN | 104200925 A | * 12/2014 |
| WO | WO2014066574 | 5/2014 |

(Continued)

OTHER PUBLICATIONS

Huang etal, "UV-assisted reduction of graphene oxide on Ni foam as high performance electrode for supercapacitors," Carbon 107 (2016) pp. 917-924 (Year: 2016).*

(Continued)

*Primary Examiner* — Nicholas A Smith
*Assistant Examiner* — Colleen M Raphael
(74) *Attorney, Agent, or Firm* — Dority & Manning, P.A.

(57) ABSTRACT

The present disclosure is directed to a low temperature method of preparing graphene. The method comprises applying a graphene oxide to a substrate and treating the graphene oxide on the substrate using photoreduction to reduce and stitch the graphene oxide to graphene. The present disclosure is also directed to graphene produced according to the aforementioned method.

13 Claims, 2 Drawing Sheets

(56) References Cited

U.S. PATENT DOCUMENTS

| | | | |
|---|---|---|---|
| 2013/0015409 A1 | 1/2013 | Fugetsu | |
| 2013/0048339 A1 | 2/2013 | Tour et al. | |
| 2013/0122220 A1* | 5/2013 | Won | B82Y 40/00 427/595 |
| 2013/0180842 A1 | 7/2013 | Blanton et al. | |
| 2013/0183226 A1 | 7/2013 | Todoriki et al. | |
| 2013/0202813 A1 | 8/2013 | Chueh et al. | |
| 2013/0266869 A1 | 10/2013 | Todoriki et al. | |
| 2013/0341792 A1* | 12/2013 | Noda | B82Y 40/00 257/741 |
| 2014/0134092 A1 | 5/2014 | Shankman | |
| 2014/0147648 A1 | 5/2014 | Zhamu et al. | |
| 2014/0216919 A1* | 8/2014 | Song | B01J 19/127 204/157.47 |
| 2014/0239236 A1* | 8/2014 | Shukla | B01J 19/123 204/157.47 |
| 2014/0242496 A1 | 8/2014 | Ryu et al. | |
| 2014/0256120 A1 | 9/2014 | Guo et al. | |
| 2014/0261998 A1 | 9/2014 | Veerasamy | |
| 2015/0064451 A1 | 3/2015 | Kalaga et al. | |
| 2015/0099214 A1 | 4/2015 | Khe et al. | |
| 2018/0250704 A1* | 9/2018 | Truica-Marasescu | C01B 32/194 |

FOREIGN PATENT DOCUMENTS

| | | |
|---|---|---|
| WO | WO2014081389 | 5/2014 |
| WO | WO2014134782 | 9/2014 |
| WO | WO2012107525 | 8/2017 |

OTHER PUBLICATIONS

Patent Translate (English-language translation) of CN 104200925 A (Year: 2014).*

Huang et al, "UV-assisted reduction of graphene oxide on Ni foam as high performance electrode for supercapacitors," Carbon 107 (2016) pp. 917-924 Supplemental Material (Year: 2016).*

Pumera, "Electrochemistry of graphene, graphene oxide and other graphenoids: Review," Electrochemistry Communications 36 (2013) pp. 14-18 (Year: 2013).*

Derwent Abstract of KR 2016092344 A (Year: 2016).*

Derwent Abstract of CN 104264130 A (Year: 2015).*

IP.com translated version of KR 2018-0079234 A (Year: 2018).*

Chen et al., Preparation of graphene by a low-temperature thermal reduction at atmosphere pressure, Nanoscale, vol. 2, 2010, pp. 559-563.

Elias et al., Control of Graphene's Properties by Reversible Hydrogenation: Evidence for Graphane, Science, Jan. 30, 2009, vol. 323, pp. 610-613.

Li et al., Large-Area Synthesis of High-Quality and Uniform Graphene Films on Copper Foils, Science Express, May 7, 2009, 12 pages.

Mao et al, Specific Protein Detection Using Thermally Reduced Graphene Oxide Sheet Decorated with Gold Nanoparticle-Antibody Conjugates, Advanced Materials, 2010, vol. 22, pp. 3521-3526.

Nguyen et al., Seamless Stitching of Graphene Domains on Polished Copper (111) Foil, Advanced Materials, vol. 27, 2015, pp. 1376-1382.

Wang et al., Low-Temperature Processed Electron Collection Layers of Graphene/TiO2 Nanocomposites in Thin Film Perovskite Solar Cells, Nano Letters, Dec. 16, 2013, vol. 14, pp. 724-730.

Williams et al., TiO2-Graphene Nanocomposites. UV-Assisted Photocatalytic Reduction of Graphene Oxide, ACS NANO, vol. 2, 2008, pp. 1487-1491.

* cited by examiner

METHOD OF MANUFACTURING GRAPHENE USING PHOTOREDUCTION

FEDERAL RESEARCH STATEMENT

This invention was made with Government support under Contract No. DE-AC09-08SR22470, awarded by the U.S. Department of Energy. The Government has certain rights in the invention.

BACKGROUND OF THE INVENTION

Graphene has attracted a lot of attention due to its electronic and mechanical properties. As a result, efforts have been made to find easy, efficient methods of preparing graphene, especially in high yield. Conventionally, graphene has been produced through a chemical vapor deposition process. However, such processes require substantially high temperatures, such as at least 1000° C. In addition, the yield and production capabilities when using such processes are limited. Furthermore, chemical vapor deposition processes can require substantial resources and costs.

As a result, there is a need to provide an efficient and effective method of manufacturing graphene, in particular at low temperatures.

SUMMARY OF THE INVENTION

Aspects and advantages of the invention will be set forth in part in the following description, or may be apparent from the description, or may be learned through practice of the invention.

In accordance with one embodiment of the present invention, a method for manufacturing graphene is disclosed. The method comprises applying a graphene oxide to a substrate and treating the graphene oxide on the substrate using photoreduction to reduce and stitch the graphene oxide to graphene.

In accordance with another embodiment of the present invention, a graphene is disclosed. In particular the graphene is manufactured by applying a graphene oxide to a substrate and treating the graphene oxide on the substrate using photoreduction to reduce and stitch the graphene oxide to graphene These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
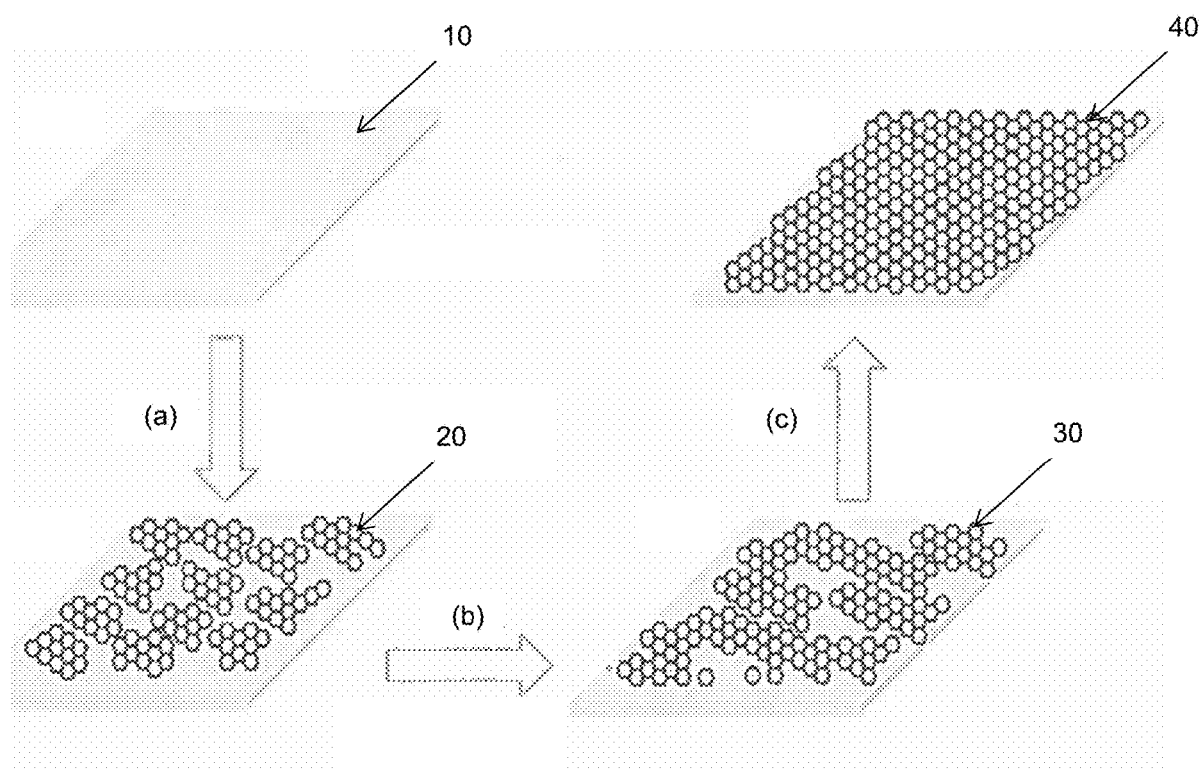
FIG. 1 provides one embodiment of a method of manufacturing graphene.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally speaking, the present invention is directed to a method of manufacturing graphene. The method comprises applying a graphene oxide to a substrate and treating the graphene oxide on the substrate using photoreduction to reduce and stitch the graphene oxide to graphene.

The present inventors have discovered that employing the method, in particular such photoreduction, can provide various advantages over other techniques, such as chemical vapor deposition. In particular, the method disclosed herein allows for scalability of the process in order to increase yield and productivity because such method is not dependent upon the size of a furnace, which is required for chemical vapor deposition. In addition, such method also allows for the production of high quality graphene, in particular at low temperatures. Furthermore, such method can allow for the production of graphene having a wide variety of shapes and configurations to allow for application for various surface coatings.

As used herein, graphene is one in which multiple carbon atoms are covalently bonded to one another. For instance, graphene is a single atomic layer of $sp^2$-bonded carbon atoms that are packed into a two-dimensional honeycomb crystal lattice. The bonds allow for the formation of a polycyclic aromatic molecule. The graphene forms a monolayer having a sheet-like structure. In one embodiment, the covalently bonded carbon atoms form a 6 circular ring as a basic repeat unit. The present invention may also be employed to provide graphene containing a single sheet or graphene with a few layers.

In one embodiment, the graphene may have a carbon to oxygen ratio of at least 5:1, such as at least 10:1, such as at least 25:1, such as at least 50:1, such as at least 75:1, such as at least 100:1, such as at least 150:1, such as at least 200:1, such as at least 250:1. The carbon to oxygen ratio may be 500:1 or less, such as 250:1 or less, such as 175:1 or less, such as 125:1 or less, such as 100:1 or less, such as 50:1 or less. In one embodiment, the graphene may not contain any oxygen atoms. In one embodiment, the graphene oxide, reduced graphene oxide, or both may have the aforementioned carbon to oxygen ratio.

In one embodiment, the graphene may have a carbon to hydrogen ratio of at least 5:1, such as at least 10:1, such as at least 25:1, such as at least 50:1, such as at least 75:1, such as at least 100:1, such as at least 150:1, such as at least 200:1, such as at least 250:1. The carbon to hydrogen ratio may be 500:1 or less, such as 250:1 or less, such as 175:1 or less, such as 125:1 or less, such as 100:1 or less, such as 50:1 or less. In one embodiment, the graphene may not contain any hydrogen atoms. In one embodiment, the graphene oxide, reduced graphene oxide, or both may have the aforementioned carbon to hydrogen ratio.

The graphene may include 50 atomic % or more of carbon atoms, such as 70 atomic % or more of carbon atoms, such as 80 atomic % or more of carbon atoms, such as 90 atomic % or more of carbon atoms, such as 95 atomic % or more of carbon atoms, such as 98 atomic % or more of carbon atoms, such as 99 atomic % or more of carbon atoms, such as 100 atomic % of carbon atoms. The graphene may include less than 100 atomic % of carbon atoms, such as 95 atomic % or less of carbon atoms, such as 90 atomic % or less of carbon atoms. The graphene may include elements, other than carbon and hydrogen (e.g., oxygen), in an amount of 15 atomic % or less, such as 10 atomic % or less, such as 5 atomic % or less. The graphene may include elements, other than carbon, in an amount of 30 atomic % or less, such as 20 atomic % or less, such as 10 atomic % or less, such as 5 atomic % or less.

The graphene oxide, reduced graphene oxide, or both as disclosed herein may have an atomic oxygen concentration of 1% or more, such as 2% or more, such as 5% or more, such as 10% or more, such as 20% or more, such as 25% or more, such as 30% or more, such as 50% or more, such as 60% or more, such as 70% or more. The graphene oxide, reduced graphene oxide, or both as disclosed herein may have an atomic oxygen concentration of 90% or less, such as 80% or less, such as 60% or less, such as 50% or less, such as 40% or less, such as 35% or less, such as 25% or less, such as 20% or less.

The graphene oxide, reduced graphene oxide, or both as disclosed herein may have an atomic oxygen concentration of 1% or more, such as 2% or more, such as 5% or more, such as 10% or more, such as 20% or more, such as 25% or more, such as 30% or more, such as 50% or more, such as 60% or more, such as 70% or more. The graphene oxide, reduced graphene oxide, or both as disclosed herein may have an atomic oxygen concentration of 90% or less, such as 80% or less, such as 60% or less, such as 50% or less, such as 40% or less, such as 35% or less, such as 25% or less, such as 20% or less.

In addition, in one embodiment, the graphene oxide may be doped. That is, it may include another element aside from carbon in the backbone of the structure. In particular, a carbon atom in the graphene oxide may be substituted for another atom. For instance, the graphene oxide may be doped with a reactive nonmetal, a metalloid, a transition metal, etc. In one embodiment, the dopant includes a reactive nonmetal, such as nitrogen, selenium, or the like. In another embodiment, the dopant includes a transition metal, such as platinum, cobalt, indium, or the like. In a further embodiment, the dopant includes a metalloid, such as boron or the like. However, it should be understood that the graphene oxide may also be doped with other atoms as generally known in the art. By doping with other atoms, the structure can be altered as the doping atoms have a different valence structure than carbon.

In one embodiment, the graphene may include continuous graphene layers or sheets. That is, in one embodiment, the graphene may include continuous graphene sheets containing carbon. In other words, the substrate may not include any discrete graphene flakes and/or discrete graphene oxide flakes on the surface as such flakes may be stitched to form the graphene. For instance, when analyzing via FT-IR, as the conversion occurs from graphene oxide to graphene, peaks associated with oxygen functional groups and carboxyl functional groups should be sufficiently reduced or entirely removed. Other various techniques, such as x-ray diffraction and Raman spectroscopy may also be utilized to determine the presence of a continuous layer. These techniques can provide an indication of the reduction process. In addition, the extent of stitching of flakes can also be assessed by measuring the electrical conductivity using a four point probe.

In addition, the continuous graphene sheets may have at last one dimension that is at least 0.001 cm, such as at least 0.01 cm, such as at least 0.1 cm, such as at least 0.25 cm, such as at least 0.5 cm, such as at least 0.75 cm, such as at least 1 cm, such as at least 2 cm, such as at least 5 cm. In this regard, the flakes (or otherwise referred to as microplatelets and/or nano-platelets) may be stitched to form the continuous graphene sheets. Typically, such stitching can result in an increase in at least 2, such as at least 3, such as at least 4, such as at least 5, such as at least 10 orders of magnitude from the original size of the flakes.

In addition, due to the stitching (e.g., edge stitching) of the graphene oxide, such as the graphene oxide flakes, herein, in one embodiment, such stitching may not result in any graphene grain boundaries in the final graphene. Generally, such boundaries are present when the edge directions of two graphene domains are mismatched. In this regard, the method disclosed herein may provide a graphene having an improved quality. Generally, when present, such boundaries may be observed using UV exposure under moisture ambient conditions as generally known in the art. Without grain boundaries, the graphene may have potential applications as a permeation barrier. However, in one embodiment, with the presence of a grain boundary, the graphene may have a potential application as a separation membrane as the defect may allow certain analytes to pass through.

The graphene disclosed herein is manufactured using a graphene oxide. As used herein, the graphene oxide may also refer to a reduced graphene oxide. The graphene oxide, such as the reduced graphene oxide, can be commercially obtained or produced using methods generally known in the art, such as the conventional Hummer method. In general, graphene oxide may be converted to reduced graphene oxide using any method generally known in the art. For instance, such conversion may be upon exposure to radiation, such as that having a peak wavelength of less than 400 nm. Nevertheless, the conversion from graphene oxide to reduced graphene oxide may be at least 40%, such as at least 50%, such as at least 60%, such as at least 70%, such as at least 80% as determined using various techniques known in the art. For instance, various spectroscopy techniques, such as XPS and infrared, can allow for the determination of the loss of oxygen containing functional groups that can correlate to the reduction process.

In general, the substrate refers to a support structure for the graphene. The substrate may be a flexible substrate. The substrate may be a plastic substrate or a metal substrate. For instance, the plastic substrate may be a thermoplastic polymer, a thermoset polymer, or a mixture thereof. In particular, the plastic substrate may be a rubber.

In addition, in one embodiment, the metal substrate may also be catalyst support. For instance, the metal substrate may be employed to catalyze the reduction reactions for the conversion of the graphene oxide to graphene and the stitching of the graphene oxide flakes for the formation of the graphene.

Examples of such metal substrates include, but are not limited to, nickel, copper, stainless steel, iron, gold, aluminum, silver, platinum, an alloy thereof, etc. In one embodiment, the metal substrate includes nickel. In another embodiment, the metal substrate includes copper. In another embodiment, the metal substrate includes stainless steel. However, it should be understood that various types of metal substrates may be used in accordance with the present invention.

The substrate may be in any general form. For instance, the substrate may be relatively thin. In this regard, the substrate may be provided as a thin film or foil. However, it should be understood that such form is not necessarily limited to such a foil. The substrate may have a thickness of 10 nm or more, such as 20 nm or more, such as 30 nm or more, such as 50 nm or more to 500 nm or less, such as 400 nm or less, such as 300 nm or less, such as 200 nm or less, such as 100 nm or less. However, the substrate may even have a greater thickness, for instance greater than 500 nm. For instance, the substrate may have a thickness of a micron dimension, such as 1 μm or more.

In addition, the substrate may have any geometry. For instance, the substrate may be planar, curvilinear, or include a combination thereof. In one embodiment, the metal substrate may be planar. In another embodiment, the substrate may be curvilinear.

When applied (or deposited) to the substrate, the graphene oxide can be provided using various means known in the art. For instance, the graphene oxide may be applied as a dispersion or via electrodeposition. Additionally, alternative methods of coating may also be employed to apply the graphene oxide. In one embodiment, the graphene oxide is provided in the form of a dispersion. For instance, the graphene oxide may be provided in a solid phase in the dispersion and when applied to the substrate.

The dispersion medium may be a solvent. In one embodiment, the solvent may be an organic solvent. In one embodiment, the solvent may be a polar solvent. For instance, the polar solvent may be acetone, acetonitrile, tetrahydrofuran, an alcohol (e.g., n-butanol, isopropyl alcohol, n-propanol, ethanol, methanol, etc.), acetic acid, water, and the like. In one particular embodiment, the solvent may be water. The water may be an acidified water having a pH of less than 7, such as 6 or less, such as 5 or less. The solvent may be one that can be easily removed at the appropriate time upon formation of the graphene. For instance, the solvent may be removed via evaporation or air drying, vacuum drying, and/or heating. Also, the removal can be prior to the photoreduction, after the photoreduction, and/or during the photoreduction.

The graphene oxide may be provided in the dispersion in any desired concentration to provide the desired thickness. The concentration may be 0.1 mg/mL or more, such as 0.2 mg/mL or more, such as 0.25 mg/mL or more, such as 0.5 mg/mL or more, such as 0.75 mg/mL or more, such as 1 mg/mL or more, such as 2 mg/mL or more, such as 3 mg/mL or more to 10 mg/mL or less, such as 5 mg/mL or less, such as 4.5 mg/mL or less, such as 4 mg/mL or less, such as 3 mg/mL or less, such as 2 mg/mL or less.

The method employed herein can provide a graphene having a desired thickness. Such thickness is not necessarily limited and can be tailored via various means. For instance, the desired thickness can be achieved by changing the concentration of the graphene oxide in the solution or by repeated coatings. Nevertheless, the thickness of the graphene can be 1 layer, such as 2 layers or more, such as 3 layers or more, such as 4 layers or more, such as 5 layers or more to 20 layers or less, such as 15 layers or less, such as 12 layers or less, such as 10 layers or less, such as 8 layers or less, such as 5 layers or less, such as 4 layers or less, such as 3 layers or less. In this regard, the graphene may be distinguished from graphite.

In addition, the graphene may have a substantially uniform thickness. The graphene may have a thickness of 5 nm or more, such as 7 nm or more, such as 10 nm or more, such as 20 nm or more, such as 30 nm or more, such as 50 nm or more to 500 nm or less, such as 400 nm or less, such as 300 nm or less, such as 200 nm or less, such as 100 nm or less.

However, the graphene may even have a greater thickness, for instance greater than 500 nm. For instance, the graphene may have a thickness of a micron dimension, such as 1 μm or more.

The suspension can be applied to the substrate using any method known in the art. For instance, application can be via spray deposition (e.g., aerosol spraying, sputtering), drop casting, rod coating, and the like. It should be understood that application is not necessarily limited to such application methods and other methods may also be employed.

FIG. 1 provides one embodiment of a method of forming graphene as disclosed herein. The substrate 10 is provided. Then, in step (a), the graphene oxide 20 is applied to the substrate 10. As indicated herein, the graphene oxide may also be reduced graphene oxide. In this regard, such application or deposition results in thin layers of unconnected and disordered graphene oxide flakes 20 on the substrate 10. In step (b), photoreduction as disclosed herein is performed to reduce the graphene oxide to begin forming the graphene 30 by stitching. Such reduction may allow for some of the unconnected and disordered graphene oxide flakes 20 to start to connect and become more ordered as the graphene oxide flakes 30. Thereafter, in step (c), edge stitching occurs through continued treatment via photoreduction to provide the graphene 40.

Figure 2:
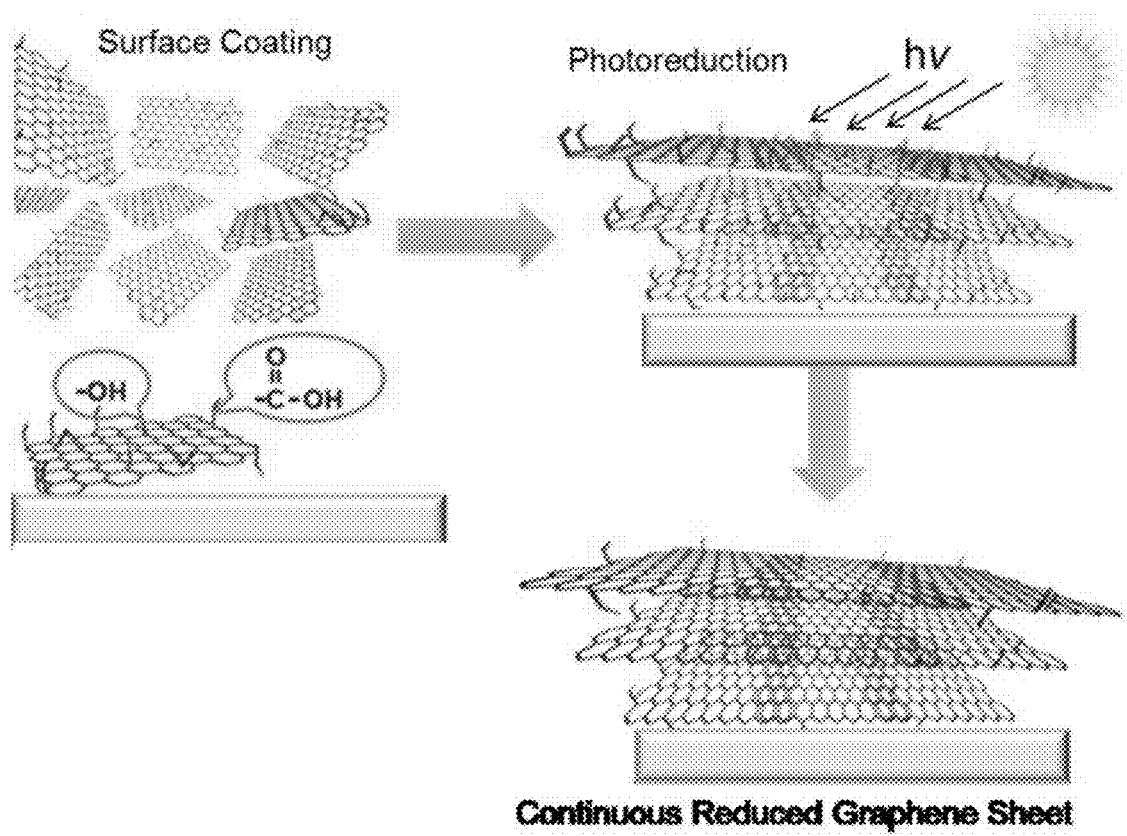
FIG. 2 provides one embodiment of a method of manufacturing graphene.

Similarly, FIG. 2 provides another embodiment of a method of forming graphene wherein photoreduction provides a continuous reduced graphene sheet. Like FIG. 1, FIG. 2 illustrates an embodiment wherein the graphene oxide flakes on the substrate are subjected to photoreduction in order to edge stitch and form a continuous, reduced graphene sheet. In addition, FIG. 2 illustrates various chemical functionalities as well as multiple graphene layers.

As disclosed herein, the presently disclosed method employs photoreduction for reducing and stitching the graphene oxide to graphene. As generally known in the art, photoreduction is a reduction reaction that is induced by light.

The light source for the photoreduction may be any generally known in the art for allowing for the reduction reaction to occur. For instance, such light may be natural light. In another embodiment, such light may be light from a Xe bulb. In another embodiment, such light may be light from a UV bulb. In this regard, it should be understood that the source of the light is not necessarily limited. For instance, any light may be employed so long as such light has a UV light component. That is, the light source can provide light having a wavelength of from 10 nm to 400 nm, such as from 100 nm to 300 nm, such as from 150 nm to 250 nm. In addition, generally, higher energy wavelength may provide for a more rapid photoreduction.

The light may be applied to the entire substrate for conversion in a single exposure. Alternatively, the light may be applied in successive portions such that conversion occurs to different sections upon each respective exposure.

The time of exposure may be tailored to allow for sufficient reduction. Such time may be 0.5 hours or more, such as 1 hour or more, such as 1.5 hours or more, such as 2 hours or more, such as 3 hours or more, such as 4 hours or more to 6 hours or less, such as 5 hours or less, such as 4 hours or less, such as 3 hours or less. For instance, the time of exposure may be from 0.5 hours to 6 hours, such as from 1 hour to 5 hours, such as from 2 hours to 4 hours.

In addition, such photoreduction process may allow for reduction or conversion of the graphene oxide to graphene at relatively low temperatures. For instance, such temperature may be 175° C. or less, such as 150° C. or less, such as 140° C. or less, such as 130° C. or less, such as 120° C. or less, such as 110° C. or less, such as 105° C. or less, such as 100° C. or less, such as 90° C. or less, such as 80° C. or less, such as 70° C. or less, such as 60° C. or less, such as 50° C. or less, such as 40° C. or less, such as 30° C. or less, such as 25° C. or less. The temperature may be about 5° C. or more, such as 10° C. or more, such as 15° C. or more, such as 20° C. or more, such as 30° C. or more, such as 40° C. or more, such as 50° C. or more, such as 60° C. or more, such as 70° C. or more, such as 75° C. or more, such as 80° C. or more, such as 90° C. or more, such as 95° C. or more. For instance, such temperature may be from 25° C. to 175° C., such as from 25° C. to 150° C., such as from 25° C. to 100° C. In one embodiment, the temperature may be at ambient temperature.

In one embodiment, heat via an external source may also be applied during the treating step. In another embodiment, heat via an external source may not be applied during the treating step. If heating is applied, the time of heating may be may be 0.5 hours or more, such as 1 hour or more, such as 2 hours or more, such as 3 hours or more, such as 5 hours or more, such as 7 hours or more, such as 10 hours or more to 15 hours or less, such as 13 hours or less, such as 12 hours or less, such as 10 hours or less, such as 8 hours or less, such as 5 hours or more to 4 hours or less, such as 3 hours or less, such as 2 hours or less. For instance, such heating may be from 1 to 12 hours.

In addition, the treatment of the graphene oxide for conversion to graphene may be performed at any pressure that allows for such conversion. In one embodiment, such pressure may be ambient pressure. For instance, the pressure may be 10 bar or less, such as 8 bar or less, such as 5 bar or less, such as 3 bar or less, such as 2 bar or less, such as 1 bar or less. The pressure may be greater than 0 bar, such as 0.5 bar or more, such as 0.9 bar or more.

Furthermore, the method disclosed herein may not require an inert atmosphere. That is, the method disclosed herein may be performed while exposed to air, such as ambient air.

As disclosed herein, the presently disclosed method employs photoreduction, which is a low temperature process. As a result, such method is distinguishable from a chemical vapor deposition which requires substantially high temperatures. In this regard, the method disclosed herein does not form graphene using a vapor deposition approach. For instance, the graphene is not synthesized by exposing the substrate to a volatile precursor that reacts and/or decomposes on a surface of the substrate to produce the desired deposit. In particular, the treatment for the conversion of the graphene oxide to graphene does not employ a vapor (e.g., a carbon containing gas) for deposition. In another embodiment, the treatment may not employ a low-frequency electromagnetic wave, in particular one produced from a microwave device. In another embodiment, the treatment may not employ an electric field, such as required by electrophoresis. In another embodiment, the treatment may not employ electric energy, such as an electric potential.

After conversion of the graphene oxide to graphene, such graphene can be used directly as manufactured on the substrate. Alternatively, the graphene can be removed from the substrate and used thereafter. In addition, such graphene can be removed from the substrate and transferred to a new substrate.

The graphene manufactured according to the method disclosed herein can have many different applications due to its excellent mechanical properties and stable chemical properties. For instance, such graphene can be used in permeation coatings and in the lubricant industries because of its temperature tolerance and anticorrosion properties. For at least this reason, the graphene can be employed in the oil and gas, automotive, and construction industries. Additionally, such graphene can be employed in the consumer electronics and semiconductor industries with applications in touch screens, transistors, flexible displayers, organic light emitting diodes, etc. The graphene may have applications in separation membranes for both gases and liquids and could potentially give high selectivity with high throughput. Examples of such applications could be for the distillation of ethanol from an ethanol/water mixture and as a fuel cell membrane in hydrogen fuel cells. Similarly, the graphene may be utilized as a corrosion or permeation barrier. Also, the graphene may have applications in catalysis substrates, in particular for polymer formation, with the potential to provide an improvement in the quality and tenability of the resultant polymer from the reaction. The graphene may also have utility in batteries and in particular as a battery anode.

In one embodiment, the graphene may serve as a passivation coating. For instance, such coatings may be employed to prevent the isotope change of protium and tritium in processing components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method for preparing graphene, the method comprising:
applying a graphene oxide to a metal substrate,
treating the graphene oxide on the metal substrate using photoreduction for 0.5 hours or more to reduce the graphene oxide to graphene in the presence of air and at a temperature of less than 100° C., and
stitching the graphene using photoreduction to form a continuous graphene sheet.

2. The method according to claim 1, wherein a source for the photoreduction is a UV light source.

3. The method according to claim 1, wherein a source for the photoreduction is a xenon bulb.

4. The method according to claim 1, wherein the treating step is conducted at a temperature of 40° C. or less.

5. The method according to claim 1, wherein the treating step is conducted at ambient pressure.

6. The method according to claim 1, wherein the metal substrate comprises copper.

7. The method according to claim 1, wherein the metal substrate comprises nickel.

8. The method according to claim 1, wherein the metal substrate comprises stainless steel.

9. The method according to claim 1, wherein the metal substrate comprises iron, gold, aluminum, silver, platinum, or an alloy thereof.

10. The method according to claim 1, wherein the graphene oxide is applied as a dispersion including water.

11. The method according to claim 1, wherein the graphene oxide includes a dopant comprising a reactive nonmetal, a metalloid, or a transition metal.

12. The method according to claim 1, wherein the graphene includes at least 80 atomic % of carbon.

13. The method according to claim 1, wherein the graphene includes 15 atomic % or less of oxygen.

* * * * *